F. H. BANBURY.
MACHINE FOR TREATING RUBBER AND OTHER HEAVY PLASTIC MATERIAL.
APPLICATION FILED SEPT. 4, 1920.
1,390,976.
Patented Sept. 20, 1921.
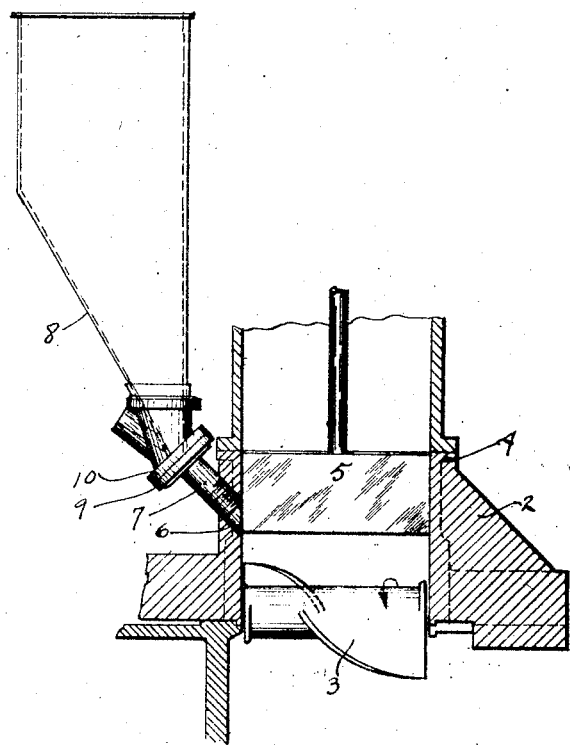

UNITED STATES PATENT OFFICE.

FERNLEY H. BANBURY, OF ANSONIA, CONNECTICUT, ASSIGNOR TO BIRMINGHAM IRON FOUNDRY, OF DERBY, CONNECTICUT, A CORPORATION.

MACHINE FOR TREATING RUBBER AND OTHER HEAVY PLASTIC MATERIAL.

1,390,976.     Specification of Letters Patent.     Patented Sept. 20, 1921.

Application filed September 4, 1920. Serial No. 408,330.

*To all whom it may concern:*

Be it known that I, FERNLEY H. BANBURY, a subject of the King of Great Britain, residing at Ansonia, in the county of New Haven and State of Connecticut, have invented a new and useful Improvement in Machines for Treating Rubber and other Heavy Plastic Material; and I do hereby declare the following, when taken in connection with the accompanying drawing and the characters of reference marked thereon, to be a full, clear, and exact description of the same, and which said drawing constitutes part of this application, and represents a broken sectional view of a machine for treating rubber and other heavy plastic material constructed in accordance with this invention, showing the hopper in side elevation.

This invention relates to an improvement in machines for treating rubber and other heavy plastic material, of the type shown and described in United States Patent No. 1,200,070, October 3d, 1916.

In treating rubber or other heavy plastic material, and particularly rubber, certain powders and other material are introduced from time to time according to the material being treated, and the object of this invention is to provide automatic means for feeding such powders; and the invention consists in the construction as hereinafter described and particularly recited in the claim.

In carrying out my invention, I employ a casing 2 similar to that shown in the patent above referred to, in which a rotor 3 is mounted, the casing being provided with a neck 4 in which a vertically movable weight 5 is arranged. In one side of the neck and approximately in line with the weight when in its depressed position, I form a hole 6 to receive a threaded nipple 7 of a hopper 8. This nipple may be formed separate from the hopper and provided with a flange 9 coupled with a flange 10 at the lower end of the hopper and so that powder or other material placed in the hopper may pass into the casing.

As the material is treated in the casing, it lumps so as to form a mass which, turned by the rotors, will cause the weight to go up and down, and when the material is in this state, it is desirable to feed additional powder or other material. In this construction, as the weight is lifted by the mass in the casing, the hole 6 in the neck is opened allowing powder in the hopper 8 to fall into the casing to be mixed with the mass being treated. When the weight descends, the hole is closed or greatly restricted in area and so as to shut off or restrain the flow of material, the hole being opened from time to time as the weight is lifted. The feeding of the powders or other material, therefore, is practically automatic, as the powders are fed when the mass being treated reaches the state that it will lift the weight, indicating that it is necessary for material to be fed.

I claim:

In a machine of the class specified, the combination with a casing formed with a neck of a vertically movable weight therein, said neck formed on one side with a hole in line with the weight when in its depressed position, and a hopper discharging into said hole whereby the flow of material through the hole is controlled by the weight.

In testimony whereof, I have signed this specification in the presence of two subscribing witnesses.

F. H. BANBURY.

Witnesses:
    FREDERIC C. EARLE,
    J. HAROLD FLYNN.